United States Patent
Bogan

[11] Patent Number: 5,983,415
[45] Date of Patent: Nov. 16, 1999

[54] TOILET RISER

[75] Inventor: David B. Bogan, Roseburg, Oreg.

[73] Assignee: Romtec, Inc., Roseburg, Oreg.

[21] Appl. No.: 09/082,296

[22] Filed: May 19, 1998

[51] Int. Cl.⁶ .................................................. A47K 11/02
[52] U.S. Cl. ...................................... 4/449; 4/239; 4/474
[58] Field of Search ............................. 4/449, 237, 239, 4/474, 475, 460, 235, 483

[56] References Cited

U.S. PATENT DOCUMENTS

| | | | |
|---|---|---|---|
| D. 237,887 | 12/1975 | Landsberger | ................................. 4/239 |
| D. 257,386 | 10/1980 | Bogan . | |
| 2,980,922 | 4/1961 | Taylor | ......................................... 4/239 |
| 3,364,505 | 1/1968 | Palmier | ....................................... 4/239 |
| 4,187,561 | 2/1980 | Bogan . | |
| 4,581,780 | 4/1986 | Hoskins et al. . | |
| 5,412,815 | 5/1995 | Ellis | ............................................ 4/239 |

*Primary Examiner*—Charles R. Eloshway
*Attorney, Agent, or Firm*—Klarquist Sparkman Campbell Leigh & Whinston, LLP

[57] ABSTRACT

A toilet riser, for use in restroom buildings, has a generally tubular shape and a hollow, double-walled construction. Liquid-tight walls define an empty chamber. The riser is formed from cross-linked polyethylene in a multi-part mold having smooth cavity surfaces so that all external surfaces of the riser are smooth and easy to clean.

10 Claims, 2 Drawing Sheets

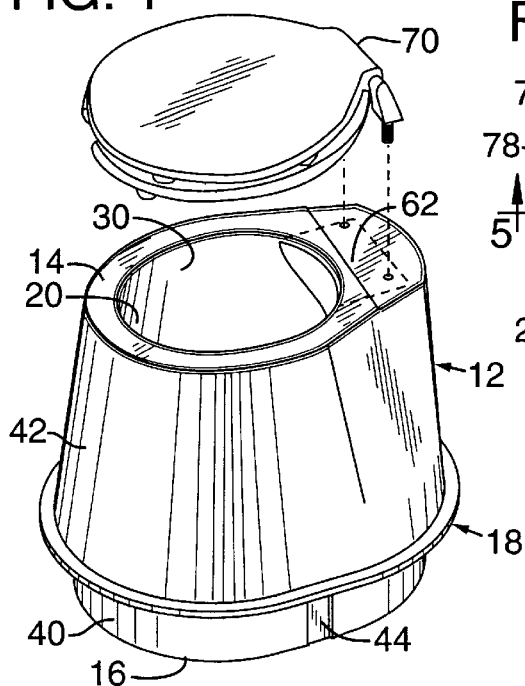
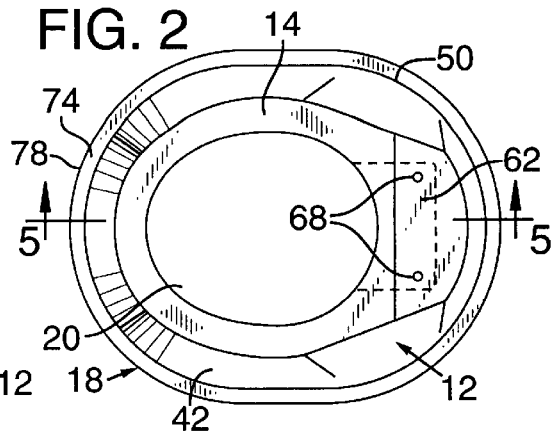
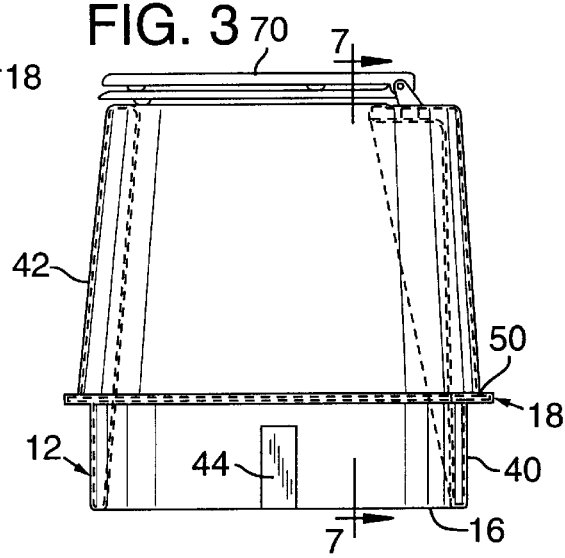
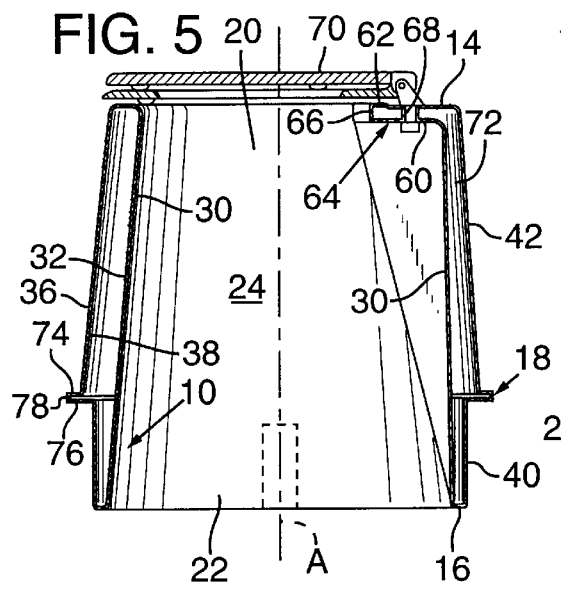
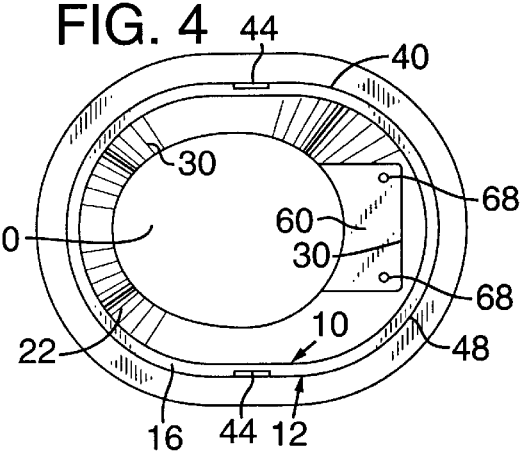

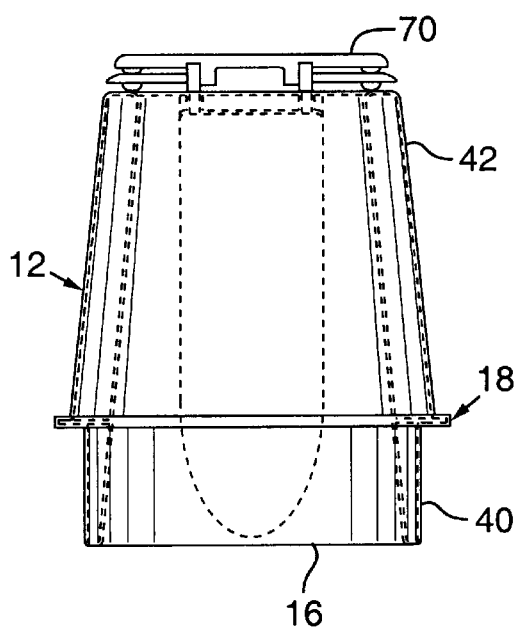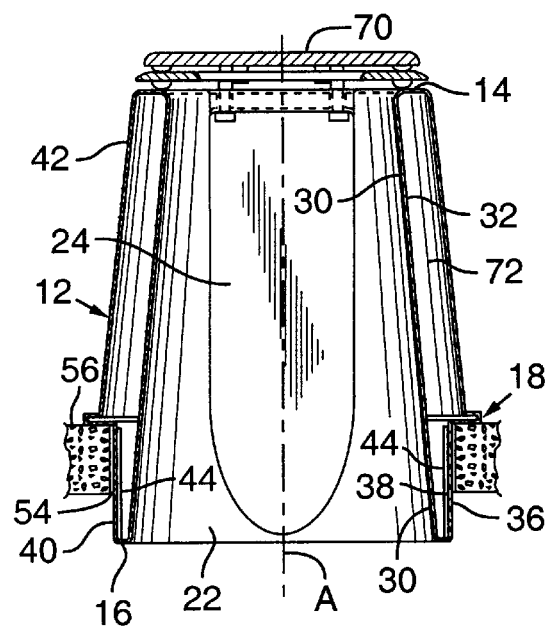

TOILET RISER

BACKGROUND OF THE INVENTION

This invention relates to toilet risers for vault toilets and more particularly to toilet risers manufactured using seamless molding techniques.

Toilet risers are used in vault toilet restroom buildings. These are commonly found in parks, campgrounds and other facilities where flush toilets can not be used because there is no convenient connection to a sufficient water supply or sewer system. Such vault toilet risers have consisted of a single, tubular wall of plastic or stainless steel on which is mounted a toilet seat.

Toilet risers used in public toilets are subject to abuse and must be easy to clean. Traditional stainless steel risers are subject to denting and wear at their welded or riveted seams. Molded plastic risers have been sturdier, but traditional molded plastic risers have at least one exposed surface that is porous, and thus difficult to clean and sanitize. Because the risers for vault toilets are not flushed with water during routine use, microorganism growth on porous surfaces is a significant concern.

Thus, there remains a need for a sturdy, thoroughly-cleanable toilet riser.

SUMMARY OF THE INVENTION

The present invention is a sturdy toilet riser which alleviates the difficulties of prior risers by its unique, double-walled construction. With a double-walled riser according to the present invention, it is possible to eliminate all exposed porous surfaces. All accessible surfaces can be of a smooth, nonporous texture that is inhospitable to microorganisms. Such surfaces are easy to wash and sanitize.

Various objects and advantages of this invention will be apparent from the following description.

BRIEF DESCRIPTION OF THE DRAWINGS

In the drawings:

FIG. 1 is a oblique view of a toilet riser according to the present invention;

FIG. 2 is a top plan view of the riser of FIG. 1 without a toilet seat attached;

FIG. 3 is a right side elevational view of the riser of FIG. 1;

FIG. 4 is a bottom plan view of the riser of to FIG. 1 without a toilet seat attached;

FIG. 5 is a sectional view taken along line 5—5 of FIG. 2;

FIG. 6 is a rear elevational view of the riser of FIG. 1; and

FIG. 7 is a sectional view taken along line 7—7 of FIG. 3.

DETAILED DESCRIPTION

The accompanying drawings show a preferred embodiment of a double-walled toilet riser according to the present invention. As viewed from the top or bottom, the riser has a generally oval-shaped body, in horizontal cross-section, that is partially provided by an inner wall 10. An outer wall 12 is spaced from and generally concentric with the inner wall 10 as shown in FIGS. 3, 5 and 6–7. An annular top bridge 14 and an annular bottom bridge 16 connect the inner wall 10 and the outer wall 12 at the top and bottom of the riser respectively. A flange 18 extends outwardly from and encompasses the outer wall 12. The inner wall 12 defines a top opening 20, a bottom opening 22 and a passageway 24 which extends between the top and bottom openings and has an axis A. The top opening 20 is adjacent the top bridge 14. The bottom opening 22 is adjacent the bottom bridge 16.

The inner wall 10 has an exterior surface 30 and an interior surface 32. The exterior surface 30 faces the passageway 24 and flares from the top opening 20 to the bottom opening 22. The outer wall has an outwardly facing exterior surface 36 and an interior surface 38. As shown in FIGS. 1 and 3–7, a lower portion 40 of the exterior surface 36, located below the flange 18, is straight-walled or tapers slightly from the flange 18 to the bottom bridge portion 16 at the base of the riser. And, an upper portion 42 of the outer surface, which upper portion is above the flange, flares from a location near the top opening 20 to the flange 18.

As seen in FIGS. 2–7, the circumference 48 of the portion 40 is less than the circumference 50 of the flaring portion 42 at locations adjacent the flange 18. This helps to rigidify the structure since the flange 18, when the riser is installed, rests on a shelf provided around the perimeter of an opening 54 in the floor 56 of a restroom building. With the illustrated offset outer wall arrangement, when the riser is in place in the opening 54 with the flange 18 resting on the floor 56, the base of the wall portion 42 is located above the shelf, rather than over the floor opening 54. This provides a rigid, well-supported structure. The flange 18 helps to rigidify the outer wall 12. The riser is further rigidified because the inner wall 10, outer wall 12, the top bridge 14, the bottom bridge 16 and the flange 18 are of an integral, unitary construction. Also, the lower portion 40 includes recessed sections 44 on opposite sides of the riser. These recessed sections serve as stiffeners to reinforce the sides of the outer wall 12.

At the top of the riser, a portion 60 of the inner wall and a portion 62 of the top bridge extend radially, inwardly at the top opening 20 to provide an inwardly-extending lip 64 at one side of the top opening 20. In the illustrated embodiment, the lip defines one portion of the top opening with the remainder of the top opening being defined by a junction of the top bridge 14 and a vertically-extending portion of the wall 10. The lip 64 has an inner edge portion 66 that extends axially relative to the passageway 24. In the illustrated embodiment, the inner edge portion 66 is a web which extends between the portion 60 of the inner wall and the portion 62 of the top bridge. The lip 64 provides a support on which to mount a toilet seat assembly 70. Axially-extending bolt holes or openings 68 are provided in the lip 64 to receive bolts which secure the toilet seat assembly 70 to the riser.

The double-walled construction makes it possible to provide a toilet riser that is easily cleanable. As can be seen from the drawings, the top bridge 14 is continuously sealed to both the inner and outer walls 10, 12 around the entire circumference of the top bridge 14. Likewise, the bottom bridge 16 is continuously sealed to both the inner and outer walls 10, 12 around the entire circumference of the bottom bridge such that the walls and the bridges together provide a hollow, liquid-tight enclosure. This enclosure defines a cavity or chamber 72 which is inaccessible.

In the illustrated embodiment, the flange 18 is a portion of the outer wall 12. The flange includes a horizontally-extending upper wall 74, a lower wall 76 that is spaced from and extends generally parallel to the upper wall 74, and a bridge 78 that extends axially to the passageway 24. The bridge 78 is a continuous band that connects the upper and lower walls 74, 76 along perimeters located outwardly of the portions 40, 42 of the wall 12. Bolt openings (not shown) may be provided in the flange to secure the flange to the floor 56.

It is a considerable advantage of the present invention that all the interior surfaces, such as surfaces 32, 38, cannot become soiled and never require cleaning. It is also an advantage that all the exterior surfaces of the walls 10, 12 and bridges 14, 16 can be made very smooth, for easy cleaning. A smooth outer surface is possible due the double-walled construction of the riser and the availability of a molding technique wherein all exterior surfaces are formed by the depositing plastic against a smooth mold surface. Even the toilet seat bolt openings 68 and any bolt openings through the flange are best molded in, rather than drilled, as drilling would break the continuity of the enclosure.

Smooth-surfaced risers according to the present invention can be formed using a multi-part mold of the type used in seamless molding techniques. The mold, when assembled, has a cavity that is defined by a smooth continuous molding surface generally in the shape of a length of a tube. More specifically, the assembled mold has a cavity defined by a continuous surface in the shape of the exterior surfaces of a generally-tubular toilet riser. Bolt openings through the lip and the flange of a toilet riser can be formed by rods that extend between opposite faces of the molding surface. The surfaces which define the cavity of the mold are polished to a high sheen, so that all exposed surfaces of the resulting risers are very smooth.

A plastic material is supplied in the cavity of the mold. And, the mold rotated such that the plastic material deposits on the smooth continuous molding surface to build up a layer of plastic at least 0.13 inch thick. It is not necessary to entirely fill the cavity with plastic since this only would add to the weight and expense of the riser. Once sufficient plastic material has deposited on the molding surface, the rotation of the mold is stopped, the mold is opened and the resulting toilet riser removed from the mold. The result is a rigid, seamless, hollow body of plastic material having features of the toilet riser described above. The plastic material is preferably white, cross-linked polyethylene, which is best applied in an amount sufficient to produce a wall thickness of 0.13 to 0.15 inches. Polyethylene, when deposited on a polished molding surface, forms a plastic part having a very smooth surface that is easily washable.

Toilet risers according to the present invention are virtually indestructible unit, even with severe use. Being made of cross-linked polyethylene material, the riser is light-weight, which reduces transportation expense and eases handling and storage. The riser resists staining, etching and other damage, and is not harmed by most chemical cleaners. Bacterial growth is resisted by molding each double-walled riser as a single piece with no joints or seams, and by providing a smooth continuous mold surface that makes all exterior riser surfaces smooth.

Having described the preferred embodiment of the invention, it should be understood that one can deviate from the preferred elements of the invention and still be within the concept of the invention described herein.

I claim:

1. A toilet riser comprising:
   an inner wall that defines a top opening, a bottom opening, and a passageway between the top and bottom openings;
   an outer wall that is spaced from and is generally concentric with the inner wall;
   a top bridge that connects the inner and outer walls at a location adjacent the top opening;
   a bottom bridge that connects the inner and outer walls at a location adjacent the bottom opening; and
   a flange that is an outward extension of the outer wall,
   the flange comprising radially extending upper and lower walls and a bridge that connects the upper and lower walls at a location distal from the passageway such that there is an air gap between the upper and lower walls, and
   the flange being located a distance from the top opening such that, when the flange rests on a shelf provided around the perimeter of an opening through the floor of a restroom, the top bridge is maintained at an elevation above the floor to support a toilet seat for use by a person in the restroom.

2. The toilet riser of claim 1 wherein the inner wall, the outer wall, the top bridge, the bottom bridge, and the flange are of integral unitary construction.

3. The toilet riser of claim 1 wherein:
   the inner wall has an exterior surface that faces the passageway and that flares from a location near the top opening; and
   the outer wall has an outwardly-facing exterior surface, a portion of the exterior surface below the flange being straight-walled, and a portion of the exterior surface above the flange flaring from a location near the top opening.

4. The toilet riser of claim 3 wherein, adjacent the flange, the circumference of the straight-walled portion of the exterior surface of the outer wall is less than the circumference of the flaring portion of the exterior surface of the outer wall.

5. The toilet riser of claim 3 wherein both the exterior surfaces are smooth.

6. The toilet riser of claim 1 wherein portions the inner wall and the top bridge extend radially inwardly at the top opening to provide an inwardly-extending lip, the lip defining at least a portion of the top opening.

7. The toilet riser of claim 6 wherein the lip has an inner edge portion that extends axially relative to the passageway, the inner edge portion extending between the inner wall and the top bridge.

8. The toilet riser of claim 1 wherein:
   the top bridge is an annulus that is continuously sealed to both the inner and outer walls around the entire circumference of the top bridge; and
   the bottom bridge is an annulus continuously sealed to both the inner and outer walls around the entire circumference of the passageway such that the walls and bridges together provide a rigid body that is a seamless, hollow, liquid-tight enclosure.

9. The toilet riser of claim 1 wherein the flange comprises:
   a horizontally-extending upper wall;
   a lower wall that is spaced from and extends generally parallel to the upper wall;
   a bridge that connects the upper and lower walls at a location distal from the passageway.

10. A toilet riser of integral unitary construction comprising:
    an inner wall that defines a top opening, a bottom opening, and a passageway between the top and bottom openings and that has a smooth exterior surface that faces the passageway and flares from a location near the top opening;

an outer wall that is spaced from and is generally concentric with the inner wall and that has an outwardly-facing exterior surface, a lower portion of the exterior surface being straight-walled and an upper portion of the exterior surface being smooth and flaring from a location near the top opening, the circumference of the lower portion of the exterior surface being less than the circumference of the upper portion of the exterior surface at the junction of the lower and upper portions of the exterior surface;

an annular top bridge that connects the inner and outer walls at a location adjacent the top opening and is continuously sealed to both the inner and outer walls around the entire circumference of the top bridge;

an annular bottom bridge that connects the inner and outer walls at a location adjacent the bottom opening and is continuously sealed to both the inner and outer walls around the entire circumference of the bottom bridge such that the walls and bridges together provide a hollow, liquid-tight enclosure;

a flange that is an outward extension of the outer wall between the upper and lower portions of the exterior surface of the outer wall and that comprises a horizontally-extending upper wall portion, a lower wall portion that is spaced from and extends generally parallel to the upper wall portion, and a bridge that connects the upper and lower wall portions at a location distal from the passageway such that there is an air gap between the upper and lower wall positions; and a lip that extends radially inwardly at the top opening to define at least a portion of the top opening, the lip being comprised of portions of the inner wall and the top bridge, and having an inner edge portion that extends axially relative to the passageway.

\* \* \* \* \*